Patented May 8, 1945

2,375,740

UNITED STATES PATENT OFFICE 2,375,740

MANUFACTURE OF DIAMIDINES

Harry James Barber, Gidea Park, Romford, England, assignor to May & Baker Limited, Dagenham, Essex, England, a British company No Drawing. Application January 13, 1942, Serial No. 426,603. In Great Britain January 2, 1941

5 Claims. (Cl. 260—564)

The present invention relates to the preparation of new therapeutically useful diamidines (including the salts thereof) and in particular to modifications of the process claimed in Specification No. 2,204,983.

Specification No. 2,204,983 claims the preparation of amidine derivatives of the stilbene series of the general type Am.B.CH=CH.B.Am in which Am. represents the amidine group and B represents a benzenoid nucleus by treating dicyano compounds of the stilbene series with anhydrous alcoholic hydrogen chloride or hydrogen bromide whereby the corresponding imino-ether hydrohalides are formed and treating the latter compounds with ammonia or salts thereof to produce the required amidines. Amidines of this general type possess valuable therapeutic properties.

We have now discovered homologues of the above type in which one or both of the hydrogen atoms of the ethylenic linkage uniting the two benzenoid nuclei are replaced by hydrocarbon radicals (specifically alkyl, aralkyl or aryl groups) which likewise possess therapeutically useful properties. These new substances can be prepared either by the process described in Specification 2,204,983 or by the modification of that process which is described in the specification of co-pending application No. 420,494.

According to one feature of the present invention, therefore, a process for the production of new therapeutically useful diamidine derivatives comprises treating a dicyano compound of the general formula:

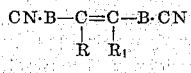

(where B represents a benzenoid nucleus—preferably a benzene nucleus—and R and R₁ may be the same or different, and represent either hydrogen atoms or hydrocarbon groups, excluding the case in which R and R₁ are both hydrogen) with anhydrous alcoholic hydrogen halide (other than hydrogen fluoride) and converting the iminoether hydrohalide thus formed with ammonia into the required diamidine.

The said dicyano compound is preferably employed in alcoholic solution or suspension which may, if desired, contain an inert organic diluent such as chloroform, dioxane or nitrobenzene. The alcohol is conveniently an aliphatic alcohol such as lower aliphatic alcohol e. g. ethyl alcohol. While hydrogen iodide might be employed in the process, it is at present preferred to use either hydrogen chloride or hydrogen bromide.

As already stated, the radicals R and R₁ in the said general formula may be the same or different and either both represent hydrocarbon radicals or one represents hydrogen and the other a hydrocarbon group. Such hydrocarbon groups may be, for example, alkyl, aryl or aralkyl groups. Those compounds in which either one or both of the radicals R and R₁ represent alkyl groups, preferably lower alkyl groups, e. g. methyl groups, are particularly valuable.

According to a further feature of this invention, the new homologues are produced by a process which comprises reacting the corresponding dicyano compound (having the general formula above set forth) with an alkali metal amide and liberating the desired diamidine-stilbine homologue from its alkali metal compound thus formed. Preferably, the two reactants are heated together in the presence of an inert solvent such as xylene, toluene, anisole, phenetole or diphenyl, the intermediate alkali metal compound formed being convertible into the corresponding diamidine hydrohalide by dilute halogen acid and thence to the free diamidine by excess of caustic alkali.

The dicyano compounds of the general formula

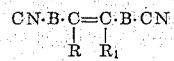

may be prepared by appropriate adaptation of the method used by Robinson et al. (Dodds, Goldberg, Lawson & Robinson, Proc. Roy. Soc. (1939), vol. 127B, pp. 140–167) for the preparation of 4:4'-dimethoxy-α-methyl-stilbene. Thus, for example 4:4'-dicyano-α-methyl-stilbene may be prepared by treating 4:4'-dibromo-deoxybenzoin with methyl magnesium iodide, dehydrating the resulting carbinol, 1:2-di(p-bromophenyl)-2-methyl-ethan-2-ol, with potassium bisulphate and heating the 4:4'-dibromo-α-methylstilbene thus formed with cuprous cyanide in pyridine. The corresponding dimethyl compound can be obtained if the dibromo-deoxybenzoin is methylated prior to treatment with the Grignard reagent. Other homologues may be obtained in a similar manner. Dicyano compounds in which the radicals R and R₁ consist of alkyl or aralkyl groups may also conveniently be prepared from diaryl ethane derivatives of the type:

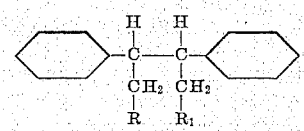

(where R and R₁ have the significance aforesaid) by the following series of reaction stages:

(i) Treatment with halogen whereby two atoms of the halogen enter into the 4:4' positions of the benzene ring while two further halogen atoms enter the alkane chain to give compounds of the styrol dihalide type viz:

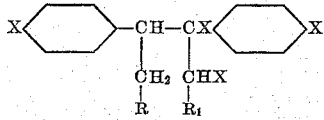

(ii) Reduction of the product to give compounds of the type

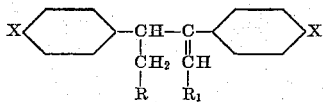

(iii) Treatment of the product of Stage ii with hydrogen halide—one molecule of the acid being readily taken up to yield a halide of the type

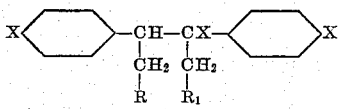

(iv) Loss of the elements of halogen acid from the product of Stage iii followed by treatment with a suitable cyanide to replace the 4:4' halogen atoms by cyanogen radicals.

The following example illustrates how the various stages of the last preceding paragraph may be carried out in the production of 4:4'-dicyano-α,β-dimethyl-stilbene:

Stage i.—50 g. of β-γ-diphenyl-n-butane (liquid racemic form or meso solid form) are boiled for several hours with 500 cc. of acetic acid, 60 cc. of bromine and 20 cc. of water. The required 4:4'-β-γ-tetrabromo-β-γ-diphenyl-n-butane separates in a pure condition and in the form of heavy prismatic crystals having a decomposition point of 170–180° C.

Stage ii.—50 g. of the above tetrabromo compound are suspended in 250 cc. of glacial acetic acid and reduced with 10 g. of zinc dust at 100° C. The reduction is rapid and is complete when all the tetrabromide in suspension has disappeared. The product, β-γ-di(p-bromophenyl)-n-butene-1, is obtained by decanting from unchanged zinc dust and pouring into water. It may be purified by crystallisation from alcohol from which it forms colourless prisms, M. P. 90–92° C.

Stage iii.—The product from Stage ii is dissolved in 3–4 volumes of dry chloroform and saturated with dry hydrogen bromide at 0° C. After a few hours at room temperature the solvent is removed at low temperature, and the residual crystalline β-bromo-β-γ-di(p-bromophenyl)-n-butane purified by crystallising from glacial acetic acid. Its decomposition point which varies with the rate of heating lies between 90 and 120° C.

Stage iv.—The tribromide so obtained is heated rapidly until decomposition sets in and the temperature is maintained until all the HBr is evolved. It is essential for the success of this operation that the decomposition be rapid and at as low a temperature as possible. The product 4:4'-bromo-α-β-dimethyl-stilbene which solidifies rapidly is purified by crystallisation from acetic acid or other suitable solvents, M. P. 125° C. and may be converted into the corresponding 4:4'-dicyano compound in manner known per se.

The present invention is illustrated by the following examples:

*Example I*

2 gm. of 4:4'-dicyano-α-methyl-stilbene is dissolved in 10 c.c. of dry chloroform and 3 c.c. of anhydrous ethyl alcohol were then added. The resulting solution was saturated with dry hydrogen chloride in the cold and then allowed to attain room temperature at which it was left for several days. The di-imino-ether dihydrochloride which separated was filtered and washed with a little chloroform. It was then treated with 35 c.c. of 10% ethyl alcoholic ammonia and heated at 60° for 2½ hours. After standing overnight the product (4:4'-diamidino-α-methyl-stilbene dihydrochloride) was filtered and washed with a little alcohol. It was purified by crystallisation from hot water acidulated with dilute hydrochloric acid. It formed pale yellow prisms which retained one molecule of water of crystallisation on air drying. The free diamidino base (M. Pt. with decomp. 215°–225° C.) was obtained by treating the salt with excess of dilute caustic soda solution.

*Example II*

3 gm. of 4:4'-dicyan-α,β-dimethyl-stilbene in finely divided condition were suspended in 100 cc. of anhydrous chloroform containing 3.5 cc. of absolute alcohol. The suspension was saturated with dry hydrogen chloride at low temperature and the mixture then allowed to stand for several days. The α,β-dimethyl-stilbene-4:4'-di-imino-ether-hydrochloride which separated was filtered, washed with a little dry chloroform and then with ether. This product was then heated at 60° C. with 100 cc. of saturated alcoholic ammonia for 2 hours.

The 4:4'-diamidino-α,β-dimethyl-stilbene-dihydrochloride which crystallised was filtered after cooling the solution, and was washed with a little absolute alcohol. The salt may be purified by recrystallising from water or from dilute hydrochloric acid. It forms pale yellow prismatic crystals containing 2 molecules of water of crystallisation which are lost on heating in vacuo at 110° C. The corresponding base, 4:4'-diamidino-α,β-dimethyl-stilbene, may be obtained from the dihydrochloride by treatment with excess of caustic soda. The melting point of the base (with decomposition) varies somewhat with the rate of heating but generally lies between 190°–195° C.

The foregoing examples illustrate the production of the new homologues by the aforesaid process which involves the production as intermediates of the di-imino-ether hydrohalides. The following example illustrates the alternative process or modification in which a dicyano compound is treated with an alkali metal amide.

*Example III*

1.7 gm. of 4:4'-dicyano-α,β-dimethyl-stilbene were dissolved in 8.0 c.c. of boiling anisole (freshly distilled), and the solution treated with a suspension of finely powdered sodamide (0.6 gm.) in anisole (6.0 c.c.). The mixture was boiled under reflux for 3½ hours, cooled and the solid which had separated filtered off.

This solid was added in portions to 20 c.c. distilled water, and again filtered. After washing with dry ether the residue was extracted with 10 c.c. of boiling hydrochloric acid (5 c.c. conc. acid: 5 c.c. water), filtered hot and the filtrate allowed to cool. The di-hydrochloride separated out and may be purified by suitable crystallisation processes. It yields on treatment with caustic soda a base which is identical with that described in Example II.

I claim:

1. A therapeutically active member of the group consisting of the diamidine derivatives of the type

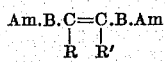

and the hydrochloric, hydrobromic and hydriodic addition compounds of said diamidine derivatives, in which Am represents the amidine group, B represents a benzene nucleus, R is a methyl radical, and R' is a member of the group consisting of hydrogen and a methyl radical.

2. 4:4' - diamidino-α-methyl-stilbene-dihydrochloride.

3. 4:4'-diamidino-α,β-dimethyl - stilbene-dihydrochloride.

4. 4:4'-diamidino-α-methyl-stilbene.

5. 4:4'-diamidino-α,β-dimethyl-stilbene.

HARRY JAMES BARBER.